United States Patent Office 3,056,826
Patented Oct. 2, 1962

3,056,826
PREPARATION OF NITRILES BY CATALYZED REACTION OF ALKYNES WITH HYDROGEN CYANIDE OR CYANOGEN
William L. Fierce, Crystal Lake, and Walter J. Sandner, Carpentersville, Ill., assignors to The Pure Oil Company, Chicago, Ill., a corporation of Ohio
No Drawing. Filed Mar. 8, 1960, Ser. No. 13,419
11 Claims. (Cl. 260—465.3)

This invention relates to new and useful improvements in processes for the preparation of saturated and mono-unsaturated aliphatic nitriles by reaction of a $C_2$–$C_{20}$ alkyne with cyanogen or hydrogen cyanide at a temperature in the range from about 300° to 800° C., in the presence of a catalyst consisting essentially of a minor amount (e.g., 0.05–5.0% wt.) of a group VIII noble metal on a refractory support, preferably a high-surface-area, refractory oxide.

In our Patent 2,802,020, we have disclosed a process for the preparation of acetonitrile by the reaction of methane with cyanogen at temperatures of 700°–1200° C. In Patent 2,809,987, we have disclosed a process in which ethane and cyanogen are reacted at temperatures above 700° C. to produce ethylene and acrylonitrile as products. In Patent 2,803,642, we have disclosed a process in which cyanogen and olefins are reacted at 700°–1000° C. to produce aliphatic nitriles. In Ayers and Fierce Patent 2,780,638, there is disclosed a process for the preparation of succinonitrile by contacting a mixture of cyanogen and ethylene with a hot metal surface, e.g., a glowing Nichrome wire, and rapidly quenching the products.

It is an object of this invention to provide a new and improved method for preparation of saturated and mono-unsaturated, aliphatic nitriles.

Another object of this invention is to provide an improved method for the preparation of nitriles by reaction of a $C_2$–$C_{20}$ alkyne with cyanogen or hydrogen cyanide in the presence of a catalyst.

A feature of this invention is the provision of an improved process for the reaction of a $C_2$–$C_{20}$ alkyne with hydrogen cyanide or cyanogen at a temperature of about 300°–800° C., in the presence of a catalyst.

Another feature of this invention is the provision of an improved process for the reaction of a $C_2$–$C_{20}$ alkyne with hydrogen cyanide or cyanogen in the presence of a catalyst consisting of a minor amount of a group VIII noble metal supported on a suitable refractory support, preferably a high-surface-area, refractory oxide, at a temperature of about 300°–800° C.

Other objects and features of this invention will become apparent from time to time throughout the specification and claims as hereinafter related.

In accordance with our invention, a mixture of one or more $C_2$–$C_{20}$ alkynes and cyanogen or hydrogen cyanide are mixed and heated to a temperature in the range from about 300° to 800° C. (preferably 500°–650° C.) in contact with a catalyst consisting of a minor amount of a group VIII noble metal on a refractory support (preferably a high-surface-area, refractory oxide). Within this range of temperature and in the presence of the aforementioned catalyst, the alkyne reacts readily with the cyanogen or with the hydrogen cyanide to form a saturated or mono-unsaturated, aliphatic nitrile. In the reaction between the alkyne and cyanogen or hydrogen cyanide, there is an unexpected molecular rearrangement which produces saturated aliphatic nitriles as the predominant product and only a minor amount of unsaturated aliphatic nitriles. This reaction proceeds well at atmospheric pressure, although it may be carried out at either subatmospheric, or superatmospheric pressures. When superatmospheric pressures are used, the reaction is somewhat hazardous due to the tendency of alkynes to detonate. In the temperature range from about 300° to 800° C., substantial yields of aliphatic nitriles are obtained, while no such nitriles are produced in the absence of the catalyst. At higher temperatures, there is substantially no yield of nitriles. In order to increase the yield per pass of the nitrile, based on the cyanogen or hydrogen cyanide charged, we prefer to use a molar excess of the alkyne over that stoichiometrically required for the reaction. Although we prefer to use a mol ratio for alkyne-to-cyanogen or hydrogen cyanide in the range from about 2–10/1, the mol ratio may vary widely as, for example, from 1–20 mols of the alkyne to 20–1 mols of the cyanogen or hydrogen cyanide. In carrying out this reaction, any alkyne which contains 2–20 carbon atoms per molecule may be used. Thus, acetylene, methylacetylene, butynes, octynes, decynes, hexadecynes, octadecynes, and eicosynes, whether straight-chain, or branched-chain, are all suitable hydrocarbons for use in this process, although the higher-molecular-weight hydrocarbons have some tendency to crack and form nitriles of the fragments produced upon cracking.

The reactant gases in this process may be passed through the reaction zone at a gaseous hourly space velocity of approximately 50 to 2000, but we prefer to operate our process at a space velocity of about 400–1000. Space velocity, as used herein, is defined as the ratio of the volume of gases (at standard temperature and pressure) charged per hour to the volume of the reaction space. In carrying out our process, the cyanogen (or hydrogen cyanide) and the alkyne may be either premixed or/and preheated, or may be separately charged to the reaction zone maintained at the desired reaction temperature. If desired, the reactants may be mixed with inert diluent gas. Any type of reaction vessel may be used which is resistant to corrosion or attack by the reactants or reaction products, including such materials as quartz, high-silica glass, or stainless steel. The reaction zone may be heated electrically, or by combustion gases applied externally, or through heating tubes placed within the reactor, or the reaction zone may be filled with refractory pebbles which are intermittently heated to the desired temperature. When refractory pebbles are used for heating, the pebbles may also be used as the support for the group VIII noble metal, although high-surface-area, catalyst supports are preferred.

When cyanogen is used as one of the reactants, the reaction effluent from the reactor contains some by-product hydrogen cyanide, the alkyl or alkenyl nitrile produced in the reaction, and unconverted hydrocarbon and/or cyanogen, as well as small amounts of other by-products. When hydrogen cyanide is used as one of the reactants, the reaction effluent comprises hydrogen, the alkyl or alkenyl nitrile product, unconverted hydrocarbon, and/or hydrogen cyanide, as well as small amounts of other by-products. In this reaction, a portion of the hydrogen is derived from the decomposition of the alkyne, as well as from the hydrogen cyanide. In either embodiment of the process, the reaction effluent is cooled to a temperature sufficiently low to condense the nitrile product, which can then be separated by fractionation to obtain substantially pure nitriles therefrom. Where hydrogen cyanide is a reactant by-product, it may be recovered and purified, and used for further reaction in this process, or may be converted by a suitable partial-oxidation process to cyanogen. Any unreacted hydrogen cyanide, cyanogen, or hydrocarbons can be recycled to the reaction zone in admixture with fresh charge gases so as to convert them to further quantities of the aliphatic nitriles.

The following non-limiting examples are illustrative of the scope of this invention.

Example I

A series of experiments was carried out using an electrically-heated Vycor (a high-silica glass) tube as the reactor. In these experiments, a gaseous mixture of cyanogen or hydrogen cyanide, acetylene, and helium was charged at atmospheric pressure to the electrically-heated Vycor tube. The effluent gases from the reaction zone were passed through a water-cooled condenser. Liquid products were subjected to infra-red analysis, while samples of the charge gas and product gases (taken after the gas had passed through the condenser) were analyzed by mass spectrometer. In runs carried out at temperatures ranging from 300° to 800° C., there was substantially no formation of organic nitriles. At temperatures above about 500° C., there was some conversion of the hydrogen cyanide or cyanogen and some decomposition of the acetylene, but no desired reaction took place. At temperatures above about 750° F. an unidentified polymer was formed.

Example II

A series of experiments was carried out using an electrically-heated Vycor (a high-silica glass) tube as the reactor. The reactor tube was charged with a granular catalyst consisting of 0.5% wt. rhodium on activated alumina, which had been predried at 500°–600° C. overnight. In these experiments, a gaseous mixture of hydrogen cyanide, acetylene, and helium was charged at atmospheric pressure to the catalyst bed in the electrically-heated Vycor tube. The effluent gases from the reaction zone were passed through a water condenser. Liquid products were identified by infra-red spectroscopy, while samples of the charge gas and product gases (taken after the gas had passed through the condenser) were analyzed by the mass spectrometer.

In the first run, a mixture of reactant gases, consisting of helium diluent, acetylene, and hydrogen cyanide in a mol ratio (of the former to the latter) of 3.8, was passed through the reactor at a gaseous hourly space velocity of 675 for a period of 30 minutes. The reactor was maintained at a temperature of 199° C. during the reaction period. During this reaction period, there was no conversion of acetylene and only a 0.7% wt. conversion of hydrogen cyanide. There was no detectable yield of organic nitriles of any kind.

In a second run of 40 minutes duration, acetylene and hydrogen cyanide were charged in a 3.7 mol ratio, at a gaseous hourly space velocity of 641, and reaction temperature of 306° C. In this run, there was a 4.7% conversion of hydrogen cyanide and a conversion of acetylene which was so small as to be practically undetectable. In this run, there was a 2.8% yield of acrylonitrile, which represented a selectivity of 61.0%, based on the hydrogen cyanide (limiting reactant) charged. From these runs, it is seen that at reaction temperatures of the order of 200°–300° C., there is little or no reaction between hydrogen cyanide and acetylene in the presence of a catalyst. At about 300° C., reaction takes place to a very small extent, and the entire product is acrylonitrile.

Example III

In another series of experiments, acetylene and hydrogen cyanide in a mol ratio of 3.5, a gaseous hourly space velocity of 653, and a reaction temperature of 510° C. were passed through the reactor tube for a period of 30 minutes. In this run, there was a 94.2% conversion of hydrogen cyanide and 85.2% conversion of acetylene. From the reaction effluent, there was recovered a mixture of aliphatic nitriles consisting of acetonitrile, acrylonitrile, and propionitrile. The molar yield per mass of nitriles in this run was acetonitrile 58.7%, acrylonitrile 6.7%, and propionitrile 22.4%, based on hydrogen cyanide charged to the reaction. The selectivities for formation of organic nitriles were acetonitrile 62.3%, acrylonitrile 7.1%, and propionitrile 23.8%, based on hydrogen cyanide consumed in the reaction. In this run, there was a formation of by-product hydrogen in a yield of 41.8%, based on acetylene charged, or a selectivity of 49.0%, based on acetylene consumed.

In a second run, acetylene and hydrogen cyanide at a mol ratio of 3.6, a gaseous hourly space velocity of 647, and a reaction temperature of 650° C. were passed through the reactor for a period of 37 minutes. In this run, there was a 9.9% conversion of hydrogen cyanide and a 65.1% conversion of acetylene. Acetonitrile was obtained in a yield of 5.5% and propionitrile in a yield of 5.9%. No acrylonitrile was formed, while by-product hydrogen was formed in a yield of 29.8%. In this run, the selectivity for formation of acetonitrile was 55.0% and for propionitrile was 60.0%. From our experiments, we have found that when acetylene and hydrogen cyanide are reacted in the presence of a catalyst consisting of a minor amount of a group VIII noble metal on a refractory support at temperatures in the range from 300° to 800° C., there is a substantial formation of saturated and mono-unsaturated aliphatic nitriles. At about 300° C., acrylonitrile is the only product from the reaction of hydrogen cyanide and acetylene over the catalyst. At temperatures in the range from about 400° to 800° C., acrylonitrile is virtually absent in the reaction products and there is an unexpectedly high yield of the saturated nitriles, acetonitrile and propionitrile. The optimum yields are obtained in the range from about 500° to 650° C. At the upper end of this range and at temperatures up to about 800° C., the formation of the desired nitriles declines due to the formation of decomposition products and the unstability of some of the nitriles at elevated temperatures.

Example IV

In another series of experiments, acetylene and hydrogen cyanide at a mol ratio of about 3.5, a gaseous hourly space velocity of about 650, and a reaction temperature of about 500°–550° C. are passed through the reactor tube using a different catalyst in each of several runs. In this series of runs, the catalysts are (1) 0.5% wt. platinum on (Alcoa F-10) activated alumina, (2) 0.5% wt. palladium on activated alumina, (3) 0.5% wt. iridium on activated alumina, (4) 0.5% wt. osmium on activated alumina, (5) 0.5% wt. rhodium on pumice, (6) 0.5% wt. palladium on silica, and (7) 0.5% wt. ruthenium on activated alumina. Using these catalysts and the reaction conditions indicated, acetonitrile and propionitrile are obtained in exceptionally good yields, together with minor amounts of acrylonitrile. Under these reaction conditions, the total yield of saturated aliphatic nitriles is in excess of about 65%, based on the hydrogen cyanide charged to the reaction. Promoters, such as chlorine, tetraethyl lead, and ethylene oxide, which are known free-radical initiators, have been found to be ineffective in accelerating the reaction of acetylene and hydrogen cyanide. Cracking catalysts, such as silica-alumina gels and Thermofor cracking catalysts, are ineffective unless impregnated with a group VIII noble metal.

Example V

In another series of experiments, acetylene and cyanogen, together with helium diluent, are passed over a catalyst in a Vycor reactor as in the previous examples, using the catalysts of Example IV. In these experiments, acetylene and cyanogen are reacted at a temperature of 500°–550° C., a mol ratio of about 3.5, and a gaseous hourly space velocity of charge gases of about 650. In each run, using the catalysts of Example IV, there is a conversion of cyanogen in excess of about 90% and a production of saturated aliphatic nitriles in excess of 65%, together with a very small amount of acrylonitrile. When acetylene and cyanogen are heated to higher temperatures, e.g., 650°–800° C., under the same general reaction conditions, there is a high conversion of cyanogen, but a lower yield of saturated aliphatic nitriles. At temperatures in excess of about 800° C., there is little or no formation of nitriles in the reaction of acetylene with either hydrogen cyanide or cyanogen in the presence of the catalysts used in this process.

In this process, it is entirely unexpected that the reaction of cyanogen or hydrogen cyanide with acetylene results in a molecular rearrangement which produces saturated aliphatic nitriles as the predominant reaction product. This reaction does not take place in the absence of a catalyst. The composition of the catalyst used is determined to a large extent by economic considerations. Generally, a minor proportion of a group VIII noble metal on a refractory oxide is a satisfactory catalyst, although high-surface-area supports, such as activated alumina or other refractory-oxide gels (having surface areas in excess of about 10 sq. m./g.) are preferred. A preferred composition is one which contains 0.05–5.0% wt. of the group VIII nobel metal on the refractory oxide, preferably activated alumina. In carrying out this process, the ratio of acetylene or other alkyne reactant to cyanogen or hydrogen cyanide is not critical, but may vary in the range from about 0.05 to 20. The velocity of charge gases through the reactor is determined largely in accordance with the desired residence time of reactants. The space velocity of reactant gases may vary widely, as for example, from 50 or less to as high as 2000 or more. While this process is effective generally through the temperature range from 300° to 800° C., it is preferred to carry the reaction out at a temperature of 500°–650° C. While acetylene is highly effective in this process, other alkynes are operative when substituted for acetylene. Thus, methylacetylene, butynes, octynes, dodecynes, etc., may be substituted for acetylene and reacted in the same manner as described in the various examples of the specification.

While we have described our invention fully and completely as required by the patent laws, with special emphasis upon several preferred embodiments thereof, we wish it to be understood that within the scope of the appended claims, this invention may be practiced otherwise than as specifically described herein.

The embodiments of the invention in which an exclusive property or privilege is claimed are defined as follows:

1. A method of preparing alkyl and alkenyl nitriles which comprises heating a $C_2$–$C_{20}$ alkyne and a cyanide compound selected from the group consisting of cyanogen and hydrogen cyanide to a temperature of about 300°–800° C., in the presence of a catalyst consisting essentially of a refractory support containing a minor amount of a group VIII noble metal, to effect a reaction therebetween, and recovering the product nitriles from the reaction effluent.

2. A method in accordance with claim 1 in which the catalyst consists of a refractory oxide containing 0.05–5.0% wt. of a group VIII noble metal, the space velocity of reactant gases is about 50–2000, and the ratio of alkyne to cyanide compound is in the range from about 0.05 to 20.

3. A method in accordance with claim 1 in which the reaction temperature is in the range from about 500° to 650° C.

4. A method in accordance with claim 1 in which the alkyne is acetylene and the product nitriles are selected from the group consisting of acetonitrile, acrylonitrile, and propionitrile.

5. A method in accordance with claim 2 in which the catalyst consists of rhodium supported on alumina.

6. A method in accordance with claim 2 in which the catalyst consists of platinum supported on alumina.

7. A method in accordance with claim 2 in which the catalyst consists of palladium supported on alumina.

8. A method in accordance with claim 2 in which the catalyst consists of iridium supported on alumina.

9. A method in accordance with claim 2 in which the catalyst consists of osmium supported on alumina.

10. A method in accordance with claim 2 in which acetylene is reacted with cyanogen at about 500°–650° C. and the product nitriles are selected from the group consisting of acetonitrile, propionitrile, and acrylonitrile.

11. A method in accordance with claim 2 in which acetylene is reacted with hydrogen cyanide at about 500°–650° C. and the product nitriles are selected from the group consisting of acetonitrile, propionitrile, and acrylonitrile.

References Cited in the file of this patent

UNITED STATES PATENTS 2,407,472    Butterbaugh et al. _____ Sept. 10, 1946